(12) United States Patent
Stockett et al.

(10) Patent No.: US 11,052,602 B2
(45) Date of Patent: Jul. 6, 2021

(54) PRINT HEAD FOR ADDITIVELY MANUFACTURING COMPOSITE TUBES

(71) Applicant: CC3D LLC, Coeur d'Alene, ID (US)

(72) Inventors: Ryan C. Stockett, Lebanon, NH (US); Kenneth Lyle Tyler, Coeur d'Alene, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 357 days.

(21) Appl. No.: 15/980,652

(22) Filed: May 15, 2018

(65) Prior Publication Data

US 2019/0001564 A1   Jan. 3, 2019

Related U.S. Application Data

(60) Provisional application No. 62/526,448, filed on Jun. 29, 2017.

(51) Int. Cl.
*B29C 64/209* (2017.01)
*B29C 64/165* (2017.01)
(Continued)

(52) U.S. Cl.
CPC .......... *B29C 64/209* (2017.08); *B29C 64/124* (2017.08); *B29C 64/165* (2017.08);
(Continued)

(58) Field of Classification Search
CPC .......... B29K 2105/00; B29K 2105/253; B29K 2105/258; B29C 2035/0827; B29C 48/15; B29C 48/151; B29C 48/153; B29C 70/00; B29C 70/48; B29C 70/50; B29C 70/521; B29C 70/523; B29C 70/542; B29C 70/682; B29C 31/002; B29C 45/14;
(Continued)

(56) References Cited

U.S. PATENT DOCUMENTS 3,286,305 A   11/1966  Seckel
3,809,514 A    5/1974  Nunez
(Continued)

FOREIGN PATENT DOCUMENTS

DE   4102257 A1   7/1992
EP   2589481 B1   1/2016
(Continued)

OTHER PUBLICATIONS

International Search Report dated Oct. 3, 2018 for PCT/US18/33272 to CC3D LLC Filed May 17, 2018.
(Continued)

*Primary Examiner* — Francisco W Tschen
*Assistant Examiner* — Edgaremanuel Troche
(74) *Attorney, Agent, or Firm* — Ryan C. Stockett

(57) ABSTRACT

A print head is disclosed for use with an additive manufacturing system. The print head may include a housing configured to receive a prefabricated woven sleeve, and a fiber guide disposed at least partially inside the housing and configured for insertion into the prefabricated woven sleeve. The print head may also include a diverter connected to an end of the fiber guide inside of a downstream mouth of the housing, and at least one cure enhancer located at the mouth of the housing.

19 Claims, 2 Drawing Sheets

(51) Int. Cl.

| | | |
|---|---|---|
| *B29C 70/06* | (2006.01) | |
| *B29C 70/52* | (2006.01) | |
| *B33Y 10/00* | (2015.01) | |
| *B29C 70/50* | (2006.01) | |
| *B29C 70/24* | (2006.01) | |
| *B29C 64/336* | (2017.01) | |
| *B29C 70/16* | (2006.01) | |
| *B29C 64/291* | (2017.01) | |
| *B33Y 50/02* | (2015.01) | |
| *B29C 64/393* | (2017.01) | |
| *B29C 64/255* | (2017.01) | |
| *B29C 70/38* | (2006.01) | |
| *B33Y 30/00* | (2015.01) | |
| *B29C 64/218* | (2017.01) | |
| *B33Y 70/00* | (2020.01) | |
| *B29C 64/295* | (2017.01) | |
| *B29C 64/124* | (2017.01) | |
| *B29C 64/40* | (2017.01) | |
| *B29K 105/00* | (2006.01) | |
| *B29K 105/08* | (2006.01) | |
| *B29C 35/08* | (2006.01) | |
| *B29C 35/02* | (2006.01) | |
| *F16L 9/128* | (2006.01) | |
| *B29C 48/15* | (2019.01) | |
| *B22F 12/00* | (2021.01) | |
| *B22F 10/10* | (2021.01) | |
| *B22F 10/00* | (2021.01) | |
| *B29C 64/245* | (2017.01) | |
| *B29C 64/112* | (2017.01) | |
| *B29K 101/10* | (2006.01) | |

(52) U.S. Cl.
CPC .......... *B29C 64/218* (2017.08); *B29C 64/255* (2017.08); *B29C 64/291* (2017.08); *B29C 64/295* (2017.08); *B29C 64/336* (2017.08); *B29C 64/393* (2017.08); *B29C 64/40* (2017.08); *B29C 70/06* (2013.01); *B29C 70/16* (2013.01); *B29C 70/24* (2013.01); *B29C 70/384* (2013.01); *B29C 70/50* (2013.01); *B29C 70/523* (2013.01); *B33Y 10/00* (2014.12); *B33Y 30/00* (2014.12); *B33Y 50/02* (2014.12); *B33Y 70/00* (2014.12); *B22F 10/00* (2021.01); *B22F 10/10* (2021.01); *B22F 12/00* (2021.01); *B29C 35/0261* (2013.01); *B29C 35/0805* (2013.01); *B29C 48/15* (2019.02); *B29C 64/112* (2017.08); *B29C 64/245* (2017.08); *B29C 2035/0827* (2013.01); *B29C 2035/0833* (2013.01); *B29C 2035/0838* (2013.01); *B29C 2035/0855* (2013.01); *B29C 2035/0877* (2013.01); *B29K 2101/10* (2013.01); *B29K 2105/08* (2013.01); *B29K 2105/251* (2013.01); *F16L 9/128* (2013.01)

(58) Field of Classification Search
CPC .............. B29C 45/14008; B33Y 10/00; B05B 13/0436; B05B 13/0463
See application file for complete search history.

(56) References Cited

U.S. PATENT DOCUMENTS

| | | |
|---|---|---|
| 3,984,271 A | 10/1976 | Gilbu |
| 3,993,726 A | 11/1976 | Moyer |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,296,335 A | 3/1994 | Thomas et al. |
| 5,340,433 A | 8/1994 | Crump |
| 5,593,527 A * | 1/1997 | Schomaker ........... F16L 11/086 156/149 |
| 5,656,117 A | 8/1997 | Wood et al. |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2012/0325965 A1* | 12/2012 | Bright ...................... B64C 3/56 244/123.11 |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |

(56) References Cited

U.S. PATENT DOCUMENTS

| | | |
|---|---|---|
| 2015/0136455 A1 | 5/2015 | Fleming |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0136897 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2017/0297053 A1 | 10/2017 | Tyler |
| 2017/0297250 A1* | 10/2017 | Tyler ............... B29C 48/33 |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016125138 A2 | 8/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

(56) References Cited

OTHER PUBLICATIONS

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-805 (May 15, 2012).

\* cited by examiner

PRINT HEAD FOR ADDITIVELY MANUFACTURING COMPOSITE TUBES

RELATED APPLICATIONS

This application is based on and claims the benefit of priority from U.S. Provisional Application No. 62/526,448 that was filed on Jun. 29, 2017, the contents of which are expressly incorporated herein by reference.

TECHNICAL FIELD

The present disclosure relates generally to a print head and, more particularly, to a print head for use in an additively manufacturing composite tubes.

BACKGROUND 3D-printing of composite tubes into free space is a known technology. For example, U.S. Patent Application Publication 2017/0297250 of Tyler filed on Apr. 15, 2016 ("the '250 publication") discloses a print head having a rotating fiber guide. Matrix-coated fibers pass through the rotating fiber guide, and the rotation of the fiber guide functions to weave the matrix-coated fibers into a tube. The tube of woven material is then directed radially outward to pass over a diverter, which establishes an inner diameter of the tube. A UV light located at an end of the diverter and inside of the tube instantly cures and hardens the matrix at discharge. As the composite tube is discharged from the print head and cured, the print head is moved by an associated support (e.g., a robot arm or gantry) to vary a trajectory of the tube in free space.

Although the print head and method of the '250 publication disclose a way to fabricate a 3-dimensional composite tube in free space, the print head may be complex and expensive. The disclosed print head and method are directed at addressing this and other issues of the prior art.

SUMMARY

In one aspect, the present disclosure is directed to a print head for an additive manufacturing system. The print head may include a housing configured to receive a prefabricated woven sleeve, and a fiber guide disposed at least partially inside the housing and configured for insertion into the prefabricated woven sleeve. The print head may also include a diverter connected to an end of the fiber guide inside of a downstream mouth of the housing, and at least one cure enhancer located at the mouth of the housing.

In another aspect, the present disclosure is directed to a method of additively manufacturing a composite tube. The method may include loading a finite length of a prefabricated woven sleeve into a print head, and wetting the prefabricated woven sleeve with a liquid matrix. The method may also include discharging the prefabricated woven sleeve from the print head, and directing a cure energy onto the prefabricated woven sleeve to cure the liquid matrix during discharging from the print head.

In yet another aspect, the present disclosure is directed to another method of additively manufacturing a composite tube. This method may include loading a finite length of a prefabricated woven sleeve into a print head, and wetting the prefabricated woven sleeve with a UV curable liquid matrix while the prefabricated woven sleeve is inside of the print head. The method may also include discharging the prefabricated woven sleeve from the print head, and directing UV light onto the prefabricated woven sleeve to cure the UV curable liquid matrix on the prefabricated woven sleeve during discharging from the print head. The method may additionally include moving the print head during discharging such that the composite tube has a three-dimensional trajectory.

DETAILED DESCRIPTION

Figure 1:
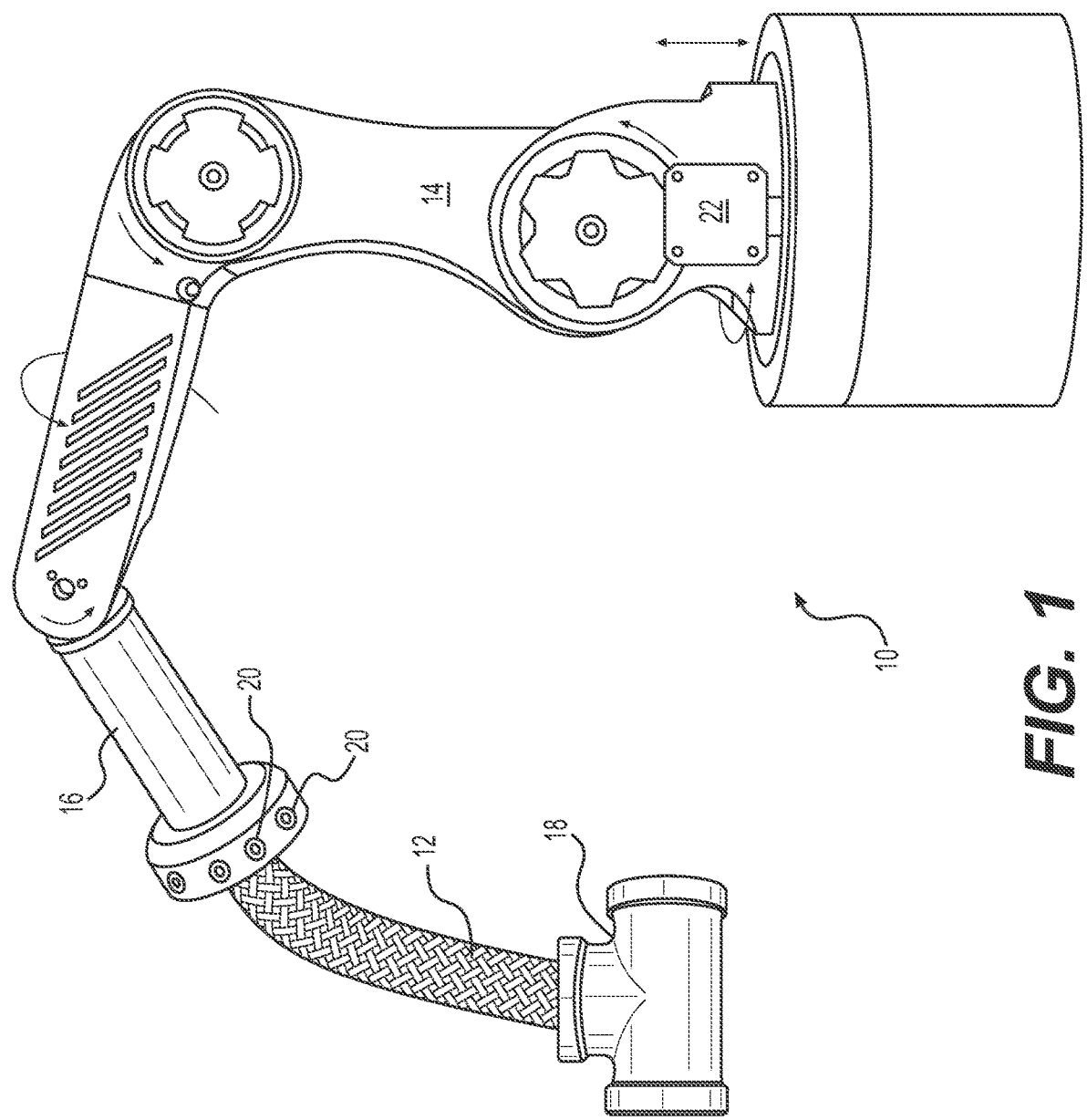
FIG. 1 is a diagrammatic illustration of an exemplary disclosed additive manufacturing system.
Figure 2:
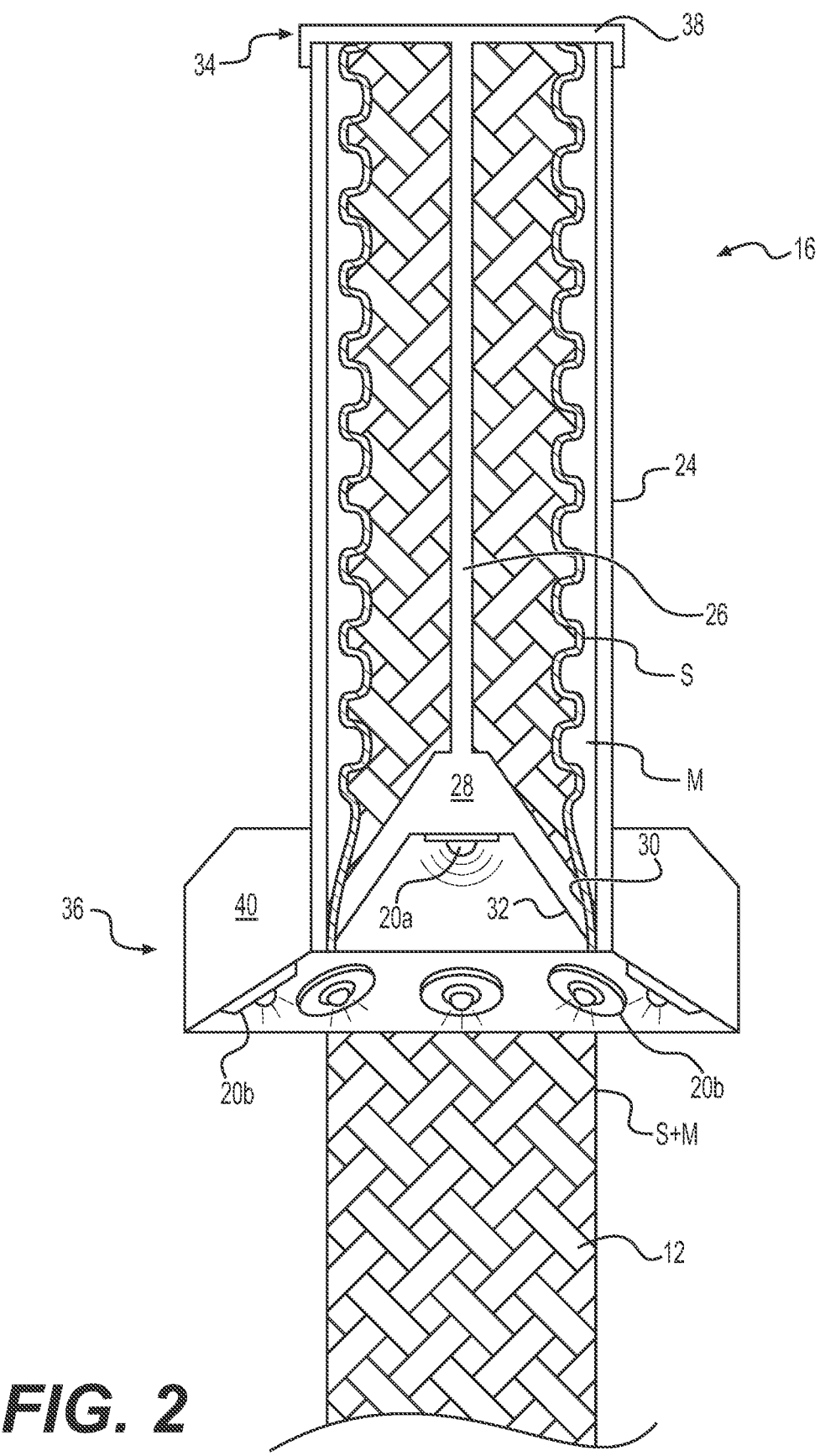
FIG. 2 is a diagrammatic illustration of an exemplary disclosed print head that may be utilized with the additive manufacturing system of FIG. 1.

FIG. 1 illustrates an exemplary system 10, which may be used to continuously manufacture a hollow composite tube 12 having any desired cross-sectional shape (e.g., circular—shown in FIGS. 1 and 2, oval, ellipsoidal, polygonal, etc.). System 10 may include at least a support 14 and a print head ("head") 16. Head 16 may be coupled to and moved by support 14. In the disclosed embodiment of FIG. 1, support 14 is a robotic arm capable of moving head 16 in multiple directions during fabrication of tube 12, such that a resulting longitudinal axis of tube 12 is three-dimensional. It is contemplated, however, that support 14 could alternatively be an overhead gantry or a hybrid gantry/arm also capable of moving head 16 in multiple directions during fabrication of tube 12. Although support 14 is shown as being capable of multi-axis movements, it is contemplated that any other type of support 14 capable of moving head 16 in the same or in a different manner could also be utilized, if desired.

Head 16 may be configured to receive or otherwise contain a matrix. The matrix may include any type of material (e.g., a liquid resin, such as a zero-volatile organic compound resin; a powdered metal; etc.) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, reversible resins (e.g., Triazolinedione, a covalent-adaptable network, a spatioselective reversible resin, etc.) and more. In one embodiment, the matrix inside head 16 may be pressurized, for example by an external device (e.g., an extruder or another type of pump—not shown) that is fluidly connected to head 16 via a corresponding conduit (not shown) and/or dispenser (e.g., jet, valve, etc.). In another embodiment, however, the matrix pressure may be generated completely inside of head 16 by a similar type of device. In yet other embodiments, the matrix may be gravity-fed through and/or mixed within head 16. In some instances, the matrix inside head 16 may need to be kept cool and/or dark to inhibit premature curing; while in other instances, the matrix may need to be kept warm for the same reason. In either situation, head 16 may be specially configured (e.g., insulated, chilled, and/or warmed) to provide for these needs.

The matrix may be used to coat, encase, saturate, and/or otherwise at least partially surround any number of continuous reinforcements that make up at least a portion of tube 12. In the disclosed embodiment, the continuous reinforcements are pre-woven (i.e., woven prior to being loaded into head 16) into a tubular sleeve. The tubular sleeve may be available in many different configurations, each configuration having a different number, size, type, and/or weave pattern of reinforcements. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix discharging from head 16.

A finite length of the tubular sleeve may be periodically loaded into and stored within head 16. It is contemplated that the tubular sleeve may be wetted with the matrix before, during, and/or after storage within and discharge from head 16, as desired. In one example, the sleeve is manually and/or automatically wetted with liquid matrix prior to being loaded into head 16. In another example, the matrix coating the reinforcements of the sleeve is at least partially dried prior to loading. In yet another embodiment, the sleeve is wetted (or further wetted) with the matrix after the sleeve is loaded into head 16. In a final example, the sleeve is wetted (or further wetted) as the sleeve discharges from head 16.

The sleeve may be discharged from head 16 via pultrusion. For example, the reinforcements making up the sleeve may be pulled from head 16, such that a tensile stress is created in the reinforcements during discharge. In this mode of operation, the matrix wetting the sleeve (if pre-wetting is utilized) may cling to the reinforcements and thereby also be pulled from head 16 along with the reinforcement. Alternatively, the matrix may be discharged from head 16 under pressure, along with the pulled reinforcement. The resulting tension in the reinforcements may increase a strength of tube 12, while also allowing for a greater length of unsupported sleeve to have a straighter trajectory (i.e., the tension may act against the force of gravity to provide free-standing support for tube 12).

The sleeve may be pulled from head 16 as a result of movement away from an anchor point 18. In the disclosed embodiment, anchor point 18 is a permanent fitting to which tube 12 should be joined. In another embodiment, anchor point 18 is only a temporary feature configured to provide a starting point for the fabrication of tube 12. At a start of structure-formation, a length of matrix-impregnated sleeve may be pulled from head 16, deposited onto a stationary anchor point 18, and cured, such that the discharged material adheres to anchor point 18. Thereafter, head 16 may be moved away from anchor point 18, and the relative movement may cause additional sleeve to be pulled from head 16. It should be noted that the movement of the sleeve through head 16 could be assisted (e.g., via internal feed mechanisms), if desired. However, the discharge rate of the sleeve from head 16 may primarily be the result of relative movement between head 16 and anchor point 18, such that tension is created within the reinforcement.

One or more cure enhancers (e.g., one or more light sources, ultrasonic emitters, lasers, heaters, catalyst dispensers, electron beam generators, microwave generators, etc.) 20 may be mounted at a distal end of head 16 and configured to enhance a cure rate and/or quality of the matrix as it is being discharged. Cure enhancer 20 may be controlled to selectively expose internal and/or external surfaces of tube 12 to energy (e.g., light energy, electromagnetic radiation, vibrations, heat, a chemical catalyst or hardener, etc.) during the formation of tube 12. The energy may increase a rate of chemical reaction occurring within the matrix, sinter the material, harden the material, or otherwise cause the material to cure as it discharges from head 16.

A controller 22 may be provided and communicatively coupled with support 14, head 16, and any number and type of cure enhancers 20. Controller 22 may embody a single processor or multiple processors that include a means for controlling an operation of system 10. Controller 22 may include one or more general- or special-purpose processors or microprocessors. Controller 22 may further include or be associated with a memory for storing data such as, for example, design limits, performance characteristics, operational instructions, matrix characteristics, reinforcement characteristics, characteristics of tube 12, and corresponding parameters of each component of system 10. Various other known circuits may be associated with controller 22, including power supply circuitry, signal-conditioning circuitry, solenoid/motor driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of tube 12. Each of these maps may include a collection of data in the form of models, lookup tables, graphs, and/or equations. In the disclosed embodiment, the maps are used by controller 22 to determine desired characteristics of cure enhancers 20, the associated matrix, and/or the associated reinforcements at different locations within tube 12. The characteristics may include, among others, a type, quantity, shape, size, and/or configuration of reinforcement and/or matrix to be discharged at a particular location within tube 12, and/or an amount, intensity, shape, and/or location of desired curing. Controller 22 may then correlate operation of support 14 (e.g., the location and/or orientation of head 16) and/or the discharge of material from head 16 (a type of material, desired performance of the material, cross-linking requirements of the material, a discharge rate, etc.) with the operation of cure enhancers 20, such that tube 12 is produced in a desired manner.

An exemplary configuration of head 16 is illustrated in FIG. 2. As can be seen in this figure, head 16 may include a series of cylindrical components nested inside each other that function to create the wall(s) of tube 12 out of the matrix-coated sleeve described above. These components may include, among other things, a housing 24, a fiber guide 26, a diverter 28, and one or more cure enhancers 20 (e.g., an internal cure enhancer 20a and any number of external cure enhancers 20b) described above. As will be explained in more detail below, the reinforcement sleeve (represented as S in FIG. 2) and matrix (represented as M in FIG. 2) may pass through an annular gap 30 between diverter 28 and housing 24 and around a mouth 32 of diverter 28, where the resin is caused to cure from the inside-out by way of internal cure enhancer 20a (e.g., a UV light and/or an ultrasonic emitter) and also from the outside-in by way of external cure enhancer(s) 20b. An inner diameter of housing 24 may be larger than an outer diameter of diverter 28 (e.g., 0-3% larger).

Housing 24 may be generally tubular, and have an open upstream end 34 and an opposing open downstream end 36. An inner diameter of housing 24 may be larger than an outer diameter of fiber guide 26 (e.g., at least 25% larger), and an internal axial length of housing 24 may be about the same as a combined length of fiber guide 26 and diverter 28. The inner diameter and axial length of housing 24 may be selected to accommodate a maximum accordioned diameter and length of the reinforcement sleeve to be stored therein around fiber guide 26. An endcap 38 may be located at upstream end 34, in some embodiments, to close off housing 24 and/or to provide support for an upstream end of fiber guide 26. In some embodiments, endcap 38 is integral with fiber guide 26. In other embodiments, endcap 38 is removably connected to fiber guide 26. A seal (e.g., an o-ring) 40 may be disposed between housing 24 and endcap 38 at upstream end 34 and/or around fiber guide 26 to inhibit liquid matrix from leaking out of housing 24.

Fiber guide 26 may embody a solid or hollow rod that is connected (e.g., integrally or removably) to diverter 28 at a downstream end. Fiber guide 26 may generally remain stationary relative to housing 24 and diverter 28, and be used primarily to hold the reinforcement sleeve during loading of head 16. It is contemplated, however, that fiber guide 26 could be vibrated, rotated, and/or axially translated during loading and/or during fabrication of tube 12.

Diverter 28 may be generally bell-shaped and have a domed or conical end located away from mouth 32. The domed or conical end may connect to fiber guide 26, have a smaller diameter than mouth 32, and be configured to slide easily into a downstream end of the reinforcement sleeve. Mouth 32 may flare radially outward from the domed end, and have an outer diameter larger than an outer diameter of fiber guide 26 and smaller than the inner diameter of housing 24. Diverter 28, due to its outwardly flaring contour, may function to divert the reinforcements of the sleeve radially outward. In this manner, a resulting internal diameter of tube 12 may be dictated by the outer diameter of diverter 28. In addition, diverter 28 may divert the fibers against the inner diameter of housing 24, thereby sandwiching the fibers within gap 30. Accordingly, the diverting function of diverter 28, in addition to establishing the internal diameter of tube 12, may also dictate the wall thickness of tube 12.

Cure enhancers 20 may be configured to continuously expose internal and/or external surfaces of tube 12 to cure energy (e.g., UV light, sound waves, electromagnetic radiation, etc.) during the formation of tube 12. The cure energy may increase a rate of chemical reaction occurring within the matrix material discharging through gap 30, thereby helping to decrease a time required for the matrix material to cure. In the disclosed embodiment, inner cure enhancer 20a is mounted within mouth 32 of diverter 28 in general alignment with an axis of fiber guide 26, and oriented to direct the cure energy axially and/or radially away from diverter 28. In this same embodiment, multiple cure enhancers 20b are equally distributed in a collar 40 located around mouth 32. In this orientation, cure enhancers 20b may direct cure energy radially inward toward the outer surface of tube 12. The amount of cure energy from cure enhancers 20 may be sufficient to cure the matrix material before tube 12 axially grows more than a predetermined length away from mouth 32. In one embodiment, tube 12 is completely cured before the axial growth length becomes equal to an external diameter of tube 12.

INDUSTRIAL APPLICABILITY

The disclosed print head may be used to continuously manufacture a composite tube having a three-dimensional trajectory, in a simple, efficient, and inexpensive manner. The disclosed print head may be simple, efficient, and inexpensive due, at least in part, to the ability to use finite lengths of prefabricated reinforcement sleeve. This simplicity may be increased even more when the prefabricated reinforcement sleeve is pre-impregnated (e.g., saturated with matrix and at least partially dried) prior to entering the print head. The composite tube may have any desired cross-sectional size, shape, length, density, and/or strength. The composite tube may include any number of different reinforcements of the same or different types, diameters, shapes, configurations, and consists, each coated with a common or unique matrix. Operation of system 10 will now be described in detail.

At a start of a manufacturing event, information regarding a desired tube 12 may be loaded into system 10 (e.g., into controller 22 that is responsible for regulating operations of support 14 and/or head 16). This information may include, among other things, a size (e.g., diameter, wall thickness, length, etc.), a contour (e.g., a trajectory), surface features (e.g., length, thickness, etc.) and finishes, connection geometry (e.g., locations and sizes of couplings, tees, splices, etc.), location-specific matrix stipulations, location-specific reinforcement stipulations, etc. It should be noted that this information may alternatively or additionally be loaded into system 10 at different times and/or continuously during the manufacturing event, if desired. Based on the component information, one or more different reinforcements (e.g., prefabricated sleeves) and/or matrixes may be selectively installed and/or continuously supplied into system 10.

Installation of the reinforcement sleeve may be performed in different ways. In one embodiment, print head 16 may first be disconnected from support 14 (referring to FIG. 1), and fiber guide 26, diverter 28, and cap 38 thereafter removed from housing 24 as a single subassembly. Alternatively, housing 24 may be removed along with collar 40 and external cure enhancers 20b, while the subassembly remains connected to support 14. For example, a relative rotation between housing 24 and cap 38 may allow for the disconnection of housing 24 from the subassembly. Alternatively, another mechanism (e.g., a magnetic latch or pneumatic connection—not shown) may be used to disconnect (and reconnect) housing 24 from the subassembly. Once housing 24 is disconnected from the subassembly, the reinforcement sleeve may be slid onto fiber guide 26 from either the upstream end 34 (e.g., after disconnect of cap 38 from fiber guide 26) or from the downstream end 36 (e.g., over diverter 28 or over the end of fiber guide 26 after removal of diverter 28). The reinforcement sleeve may be compressed axially during loading, such that the sleeve accordions (e.g., bunches up and/or folds over) onto fiber guide 26 with a length that is greater than a length of fiber guide 26.

As described above, the reinforcement sleeve may be wetted with matrix prior to the loading process, or after. For example, after loading of the reinforcement sleeve into fiber guide 26 is complete, the subassembly disclosed above may be reassembled to housing 24. Housing 24 may thereafter be filled with liquid matrix and/or an associated supply source (e.g., a jet) may be activated to advance matrix onto the reinforcement sleeve while the sleeve is inside of housing 24 and/or discharging from housing 24.

Head 16 may then be moved by support 14 under the regulation of controller 22 to cause matrix-coated reinforcements to be placed against or on a corresponding stationary anchor point 18 (referring to FIG. 1). Cure enhancers 20 within head 16 may then be selectively activated to cause hardening of the matrix surrounding the reinforcements, thereby bonding the reinforcements to anchor point 18.

The component information may then be used to control operation of system 10. For example, the reinforcements may be pulled from head 16 (along with the matrix) over diverter 28, while support 14 selectively moves head 16 in a desired manner during curing, such that an axis of the resulting tube 12 follows a desired trajectory (e.g., a free-space, unsupported, 3-D trajectory). Diverter 28 may function to establish an internal diameter of the resulting tube, as well as a wall-thickness in some instances. In addition, diverter 28 may help to fully saturate the sleeve with the matrix and/or to inhibit excessive matrix from being pulled out of housing 24 along with the sleeve. Once the accordioned sleeve is pulled completely from housing 24, another length of sleeve may be loaded into housing 24. It is contemplated that printing of tube 12 may be complete prior to usage of the full length of loaded sleeve. In this situation, once tube 12 has grown to a desired length, tube 12 may be disconnected (e.g., severed) from head 16 in any desired manner Printing of a new tube may then be started in the same manner described above.

It will be apparent to those skilled in the art that various modifications and variations can be made to the disclosed print head and method. Other embodiments will be apparent to those skilled in the art from consideration of the specification and practice of the disclosed print head and method. For example, although the disclosed embodiment utilizes a robot arm and/or gantry to move the disclosed head during tube discharging, it is contemplated that the disclosed head could be held and/or moved by hand during discharging. It is intended that the specification and examples be considered as exemplary only, with a true scope being indicated by the following claims and their equivalents.

What is claimed is:

1. A method of additively manufacturing a composite tube, comprising:
   storing a finite length of a prefabricated sleeve within a print head;
   wetting the prefabricated sleeve with a liquid matrix;
   discharging the prefabricated sleeve from the print head;
   moving the print head during discharging such that the composite tube has a three-dimensional trajectory; and
   directing a cure energy onto the prefabricated sleeve to cure the liquid matrix during discharging from the print head.

2. The method of claim 1, wherein moving the print head during discharging includes selectively activating a processor-controlled support that is connected to the print head based on desired characteristics of the composite tube.

3. The method of claim 1, wherein wetting the prefabricated sleeve includes filling the print head with the liquid matrix.

4. The method of claim 3, wherein wetting the prefabricated sleeve includes wetting the prefabricated sleeve prior to loading of the prefabricated sleeve into the print head.

5. The method of claim 4, wherein wetting the prefabricated sleeve includes wetting the prefabricated sleeve during discharge of the prefabricated sleeve from the print head.

6. The method of claim 1, wherein:
   the liquid matrix is a UV curable resin; and
   directing the cure energy onto the prefabricated sleeve includes exposing the liquid matrix to UV light.

7. The method of claim 1, wherein discharging the prefabricated sleeve from the print head includes bonding the prefabricated sleeve to an anchor, and moving the print head away from the anchor to cause the prefabricated woven sleeve to be pulled from the print head.

8. The method of claim 7, wherein the anchor is a fitting that remains permanently connected to the composite tube.

9. The method of claim 7, wherein discharging the prefabricated sleeve from the print head includes pulling the prefabricated sleeve over a diverter.

10. The method of claim 9, wherein pulling the prefabricated sleeve over the diverter establishes at least one of a diameter and a wall thickness of the composite tube.

11. The method of claim 1, wherein loading the finite length of a prefabricated sleeve into the print head includes accordioning the prefabricated sleeve onto a fiber guide inside the print head.

12. The method of claim 11, wherein the finite length of the prefabricated sleeve is longer than a length of the fiber guide.

13. A method of additively manufacturing a composite tube, comprising:
    storing a finite length of a prefabricated sleeve within a print head;
    wetting the prefabricated sleeve with a UV curable liquid matrix while the prefabricated sleeve is inside of the print head;
    discharging the prefabricated sleeve from the print head;
    directing UV light onto the prefabricated sleeve to cure the UV curable liquid matrix on the prefabricated sleeve during discharging from the print head; and
    moving the print head during discharging such that the composite tube has a three-dimensional trajectory.

14. The method of claim 13, wherein discharging the prefabricated sleeve from the print head includes bonding the prefabricated sleeve to a permanent fitting, and moving the print head away from the permanent fitting to cause the prefabricated sleeve to be pulled from the print head over a diverter that establishes at least one of a diameter and a wall thickness of the composite tube.

15. A method of additively manufacturing a composite tube, comprising:
    storing a finite length of a sleeve within a fiber guide inside of a print head, the sleeve being non-impregnated;
    wetting the sleeve with a matrix inside of the print head;
    permanently anchoring an end of the sleeve to a fitting external to the print head;
    moving the print head away from the fitting to cause the sleeve to be pulled out of the print head; and
    exposing the print sleeve to UV light during discharging to harden the matrix wetting the sleeve.

16. The method of claim 15, wherein exposing the sleeve to UV light includes exposing both an inner and an outer surface to the UV light.

17. The method of claim 15, further including sandwiching a wall of the sleeve between an inner annular diverter and an outer annular housing to establish a diameter and a thickness of the wall.

18. The method of claim 15, wherein the matrix is a liquid thermoset resin.

19. The method of claim 15, wherein pulling of the sleeve out of the print head causes the sleeve to expand from an accordioned configuration to a tubular configuration having a smooth outer surface.

* * * * *